United States Patent
Ushimaru

(10) Patent No.: US 7,228,059 B2
(45) Date of Patent: Jun. 5, 2007

(54) AUDIO REPRODUCING APPARATUS AND AUDIO REPRODUCTION CONTROL METHOD FOR USE IN THE SAME

(75) Inventor: Chikara Ushimaru, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1004 days.

(21) Appl. No.: 10/422,835

(22) Filed: Apr. 25, 2003

(65) Prior Publication Data

US 2003/0231871 A1 Dec. 18, 2003

(30) Foreign Application Priority Data

May 31, 2002 (JP) .............................. 2002-158898

(51) Int. Cl.
*H04N 5/76* (2006.01)
*H04N 5/95* (2006.01)
*H04N 7/00* (2006.01)

(52) U.S. Cl. .............................. 386/68; 386/87; 386/96

(58) Field of Classification Search .................. 386/68, 386/85–87, 96; 369/47.23; 700/94
See application file for complete search history.

(56) References Cited

U.S. PATENT DOCUMENTS

| 4,951,155 | A | * | 8/1990 | Andrews | ..................... | 386/106 |
| 6,018,376 | A | * | 1/2000 | Nakatani | ................ | 375/240.28 |
| 6,583,821 | B1 | * | 6/2003 | Durand | ........................ | 348/515 |

2003/0198460 A1 * 10/2003 Kawamura et al. ........... 386/68

FOREIGN PATENT DOCUMENTS

| JP | 5-135228 | 6/1993 |
| JP | 9-65303 | 3/1997 |
| JP | 9-261613 | 10/1997 |

OTHER PUBLICATIONS

Japanese Office Action, dated Aug. 31, 2004 for Patent Application No. 2002-158898.

* cited by examiner

*Primary Examiner*—Thai Q. Tran
*Assistant Examiner*—Nigar Chowdhury
(74) *Attorney, Agent, or Firm*—Pillsbury Winthrop Shaw Pittman, LLP

(57) ABSTRACT

An audio reproducing apparatus reproduces audio data to be reproduced in sync with video data. The audio reproducing apparatus includes a communication device configured to execute communication with another apparatus that reproduces the video data, a unit configured to detect an amount of an error between a reproduction point of the video data in the other apparatus and a reproduction point of the audio data in the audio reproducing apparatus by making use of the communication executed by the communication device with the other apparatus, a unit configured to detect, from a stream of the audio data, an audio data time period of audio data with a sound volume level lower than a specified value, and a unit configured to alter a reproduction speed of the audio data belonging to the detected audio data time period, on the basis of the detected amount of the error in reproduction point.

18 Claims, 5 Drawing Sheets

AUDIO REPRODUCING APPARATUS AND AUDIO REPRODUCTION CONTROL METHOD FOR USE IN THE SAME

CROSS-REFERENCE TO RELATED APPLICATIONS

This application is based upon and claims the benefit of priority from the prior Japanese Patent Application No. 2002-158898, filed May 31, 2002, the entire contents of which are incorporated herein by reference.

BACKGROUND OF THE INVENTION

1. Field of the Invention

The present invention relates to an audio reproducing apparatus for reproducing audio data that is to be reproduced in synchronism with video data, and to an audio reproduction control method for use in this apparatus.

2. Description of the Related Art

In these years, techniques for altering the reproduction speed of multimedia data such as video and audio have been developed.

Jpn. Pat. Appln. KOKAI Publication No. 9-261613 discloses a reproducing method that can alter a reproduction speed in an apparatus that receives and reproduces multimedia data. In this method, the reproduction speed is altered in accordance with the amount of residual data in a receiving buffer. Specifically, in this method, when the amount of residual data in the receiving buffer is large, the reproduction speed is increased. When the amount of residual data in the receiving buffer is small, the reproduction speed is decreased. Thereby, overflow or underflow of the receiving buffer is prevented.

Jpn. Pat. Appln. KOKAI Publication No. 5-135228 discloses a technique that realizes decelerated reproduction or accelerated reproduction of voice signals while maintaining high-quality reproduction, by increasing or decreasing voiceless time periods in the voice signals.

Recently, there is a demand for the advent of techniques for reproducing video data and audio data, which are to be reproduced in synchronism, using different apparatuses.

However, when video data and audio data are to be reproduced by separate apparatuses, the reproduction timing of the video data is controlled according to the time indicated by the clock provided in the apparatus for reproducing the video data. The reproduction timing of the audio data is controlled according to the time indicated by the clock provided in another apparatus for reproducing the audio data. The difference between the clock referred to for the video data reproduction timing and the clock referred to for the audio data reproduction timing causes asynchronism between reproduced video and audio. If the reproduction speed of video data or audio data is altered in order to eliminate the asynchronism, an unnatural impression may be given to the viewer/listener.

BRIEF SUMMARY OF THE INVENTION

Embodiments of the present invention provide an audio reproducing apparatus and an audio reproduction control method capable of altering an audio data reproduction speed in accordance with a degree of asynchronism between the audio data and video data that is reproduced by another apparatus, without giving an unnatural impression to the viewer/listener.

According to an embodiment of the present invention, there is provided an audio reproducing apparatus that reproduces audio data to be reproduced in sync with video data, comprising: a communication device configured to execute communication with another apparatus that reproduces the video data; a unit configured to detect an amount of a error between a reproduction point of the video data in the another apparatus and a reproduction point of the audio data in the audio reproducing apparatus by making use of the communication executed by the communication device with the another apparatus; a unit configured to detect, from a stream of the audio data, an audio data time period of audio data with a sound volume level lower than a specified value; and a unit configured to alter a reproduction speed of the audio data belonging to the detected audio data time period, on the basis of the detected amount of the error in reproduction point.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to the accompanying drawings.

Figure 1:
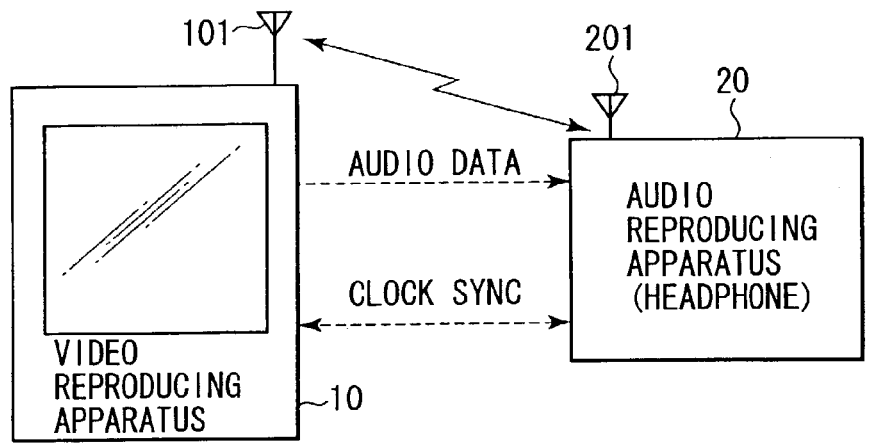
FIG. 1 shows an audio reproducing apparatus according to an embodiment of the present invention.

FIG. 1 shows an audio reproducing apparatus 20 according to an embodiment of the invention. The audio reproducing apparatus 20 is configured to reproduce audio data in synchronism with the reproduction of video data, such as moving picture, by a video reproducing apparatus 10. For example, when audio/video content, which includes video data and audio data to be reproduced in sync with the video data, is to be reproduced, the video reproducing apparatus 10 performs video data reproduction while the audio reproducing apparatus 20 performs audio data reproduction.

The audio reproducing apparatus 20, while receiving to-be-reproduced audio data from an external apparatus over a communication path by wire or by radio, reproduces the received audio data. Audio data is sent to the audio reproducing apparatus 20 by one of the following methods: (1) to send audio data from the video reproducing apparatus 10 to the audio reproducing apparatus 20, or (2) to send video data and audio data simultaneously from an external content server to the video reproducing apparatus 10 and audio reproducing apparatus 20, respectively. In the description below, method (1) is adopted.

Figure 2:
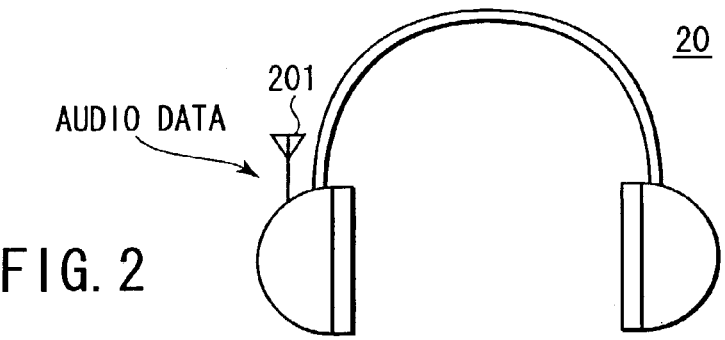
FIG. 2 shows a wireless headphone as an example that realizes the audio reproducing apparatus shown in FIG. 1.

When audio-video content is to be reproduced, the video reproducing apparatus 10 separates the audio-video content into video data and audio data. The video reproducing apparatus 10 reproduces the video data while transmitting the audio data to the audio reproducing apparatus 20. A short-distance wireless communication protocol represented by Bluetooth™ is used for audio data transmission from the video reproducing apparatus 10 to the audio reproducing apparatus 20. In this case, the video reproducing apparatus 10 transmits the audio data wirelessly from an antenna 101 to the audio reproducing apparatus 20, and the audio reproducing apparatus 20 receives the audio data via an antenna 201 from the video reproducing apparatus 10. The audio reproducing apparatus 20 is realized as a wireless headphone, as shown in FIG. 2.

The audio reproducing apparatus 20, while receiving the audio data from the video reproducing apparatus 10, reproduces the received audio data. During a time period in which the audio data is being reproduced, the audio reproducing apparatus 20 periodically communicates with the video reproducing apparatus 10 and detects an amount of an error between a reproduction point of video data in the video reproducing apparatus 10 and a reproduction point of audio data in the audio reproducing apparatus 20 (i.e. an amount of asynchronism between video and audio). In order to realize synchronous reproduction of video and audio, the audio reproducing apparatus 20 alters the reproduction speed of audio data in accordance with the detected amount of asynchronism. The alteration of reproduction speed of audio data is effected in a time period of an audio data component in which a sound volume level of audio is lower than a predetermined value.

Figure 3:
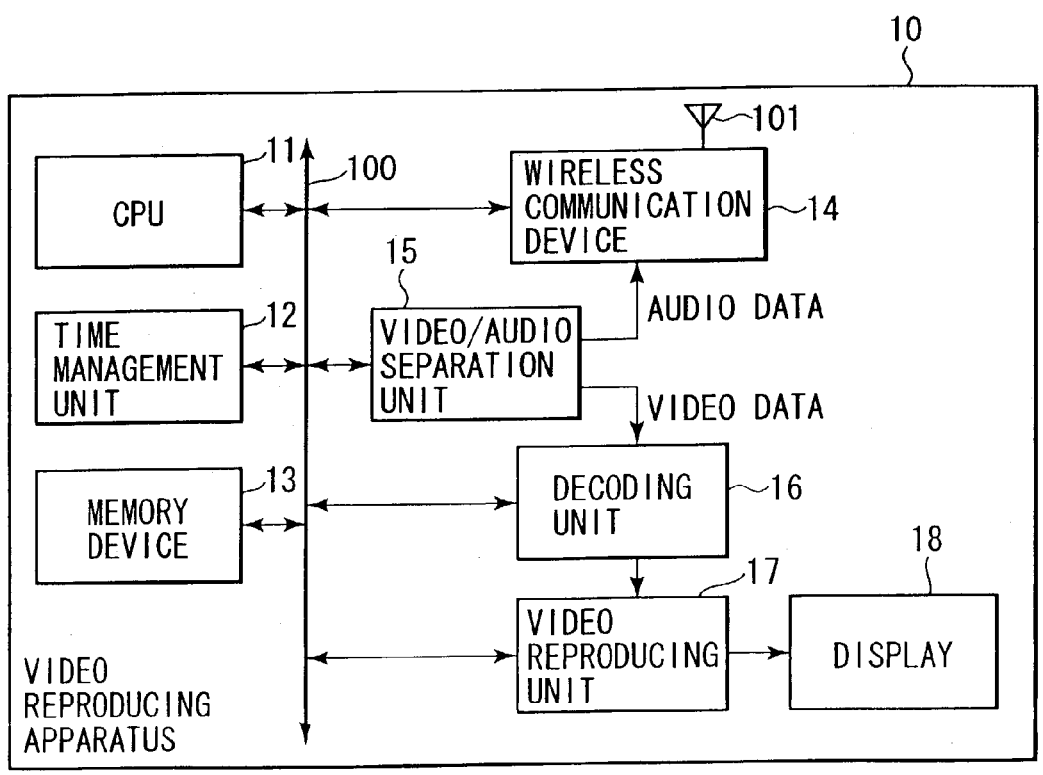
FIG. 3 is a block diagram showing an example of the structure of a video reproducing apparatus for reproducing video data that is to be reproduced in sync with audio data reproduced by the audio reproducing apparatus shown in FIG. 1.
Figure 4:
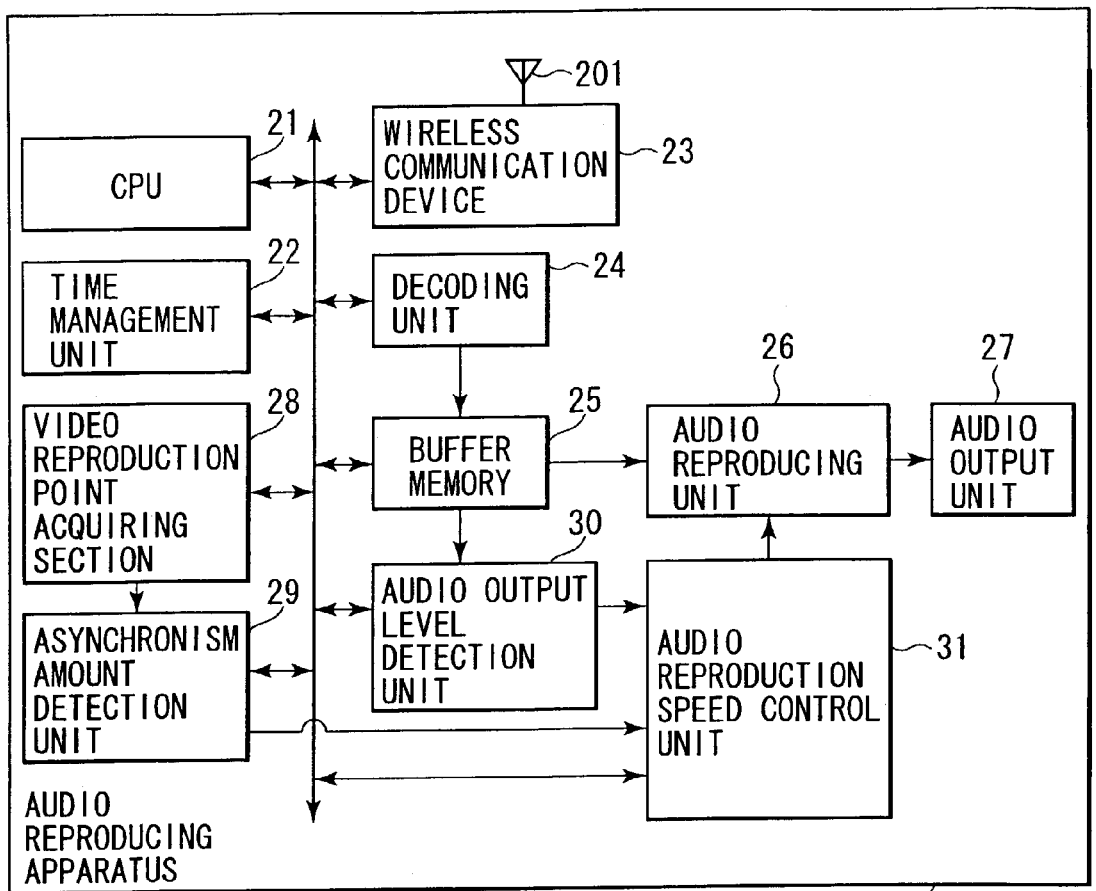
FIG. 4 is a block diagram showing an example of the structure of the audio reproducing apparatus shown in FIG. 1.

Referring to FIGS. 3 and 4, the structures of the video reproducing apparatus 10 and audio reproducing apparatus 20 will now be described.

FIG. 3 shows a system configuration of the video reproducing apparatus 10. The video reproducing apparatus 10 is realized, for example, as a portable electronic apparatus such as a PDA (Personal Digital Assistant), a portable personal computer or a mobile phone.

As is shown in FIG. 3, the video reproducing apparatus 10 comprises a CPU 11, a time management unit 12, a memory device 13, a wireless communication device 14, a video/audio separation unit 15, a decoding unit 16, a video reproducing unit 17, and a display 18.

The CPU 11 is a processor that is provided to control operations of the video reproducing apparatus 10. The CPU 11 is connected to other components of the video reproducing apparatus 10 over a bus 100. The CPU 11 cooperates with these components. The time management unit 12 comprises a clock device that measures time. The time management unit 12 provides time information which serves as a reference time for the video data reproducing operation.

The memory device 13 comprises, for instance, a non-volatile memory device, and stores audio-video content to be reproduced. The audio-video content is composed of a stream of encoded video data and a stream of encoded audio data to be reproduced in sync with the video data stream. The video data stream and audio data stream are multiplexed. AVI (Audio Video Interleave Format), for instance, may be used as a data format of audio-video content. In AVI format content data, sampling rates are recorded for associated video and audio media, respectively.

The video/audio separation unit 15 separates the to-be-reproduced content data into video data and audio data. The video data separated from the content data by the video/audio separation unit 15 is sent to the decoding unit 16, while the audio data separated from the content data by the video/audio separation unit 15 is sent to the wireless communication device 14.

The wireless communication device 14 establishes wireless connection with the audio reproducing apparatus 20 and performs wireless communication with the audio reproducing apparatus 20. The wireless communication is executed according to procedures based on, for instance, Bluetooth™ protocol. The wireless communication device 14, under control of CPU 11, transmits the encoded audio data to the audio reproducing apparatus 20 by radio signals.

The decoding unit 16 decodes the encoded video data and decompresses the compressed video data into a displayable format. The video reproducing unit 17 controls the display 18 and executes a reproducing operation for enabling the display 18 to display the video data decoded by the decoding unit 16. In this case, the reproduction speed of video data is controlled by the time information managed by the time management unit 12 and the sampling rate of the video data.

The reproduction of the video data by the video reproducing unit 17 begins after a predetermined time period has passed since the start of a process for sending the audio data to the audio reproducing apparatus 20 by radio signals. This predetermined time period is set in advance on the basis of the time needed until the audio reproducing apparatus 20 is made ready to reproduce the audio data. It is thus possible to simultaneously start the reproduction of audio data by the audio reproducing apparatus 20 and the reproduction of video data by the video reproducing unit 17.

FIG. 4 shows a system configuration of the audio reproducing apparatus 20. The audio reproducing apparatus 20 is realized as a wireless headphone, as shown in FIG. 2. The audio reproducing apparatus 20, as shown in FIG. 4, comprises a CPU 21, a time management unit 22, a wireless communication device 23, a decoding unit 24, a buffer memory 25, an audio reproducing unit 26, an audio output unit 27, a video reproduction point acquiring unit 28, an asynchronism amount detection unit 29, a sound output level detection unit 30, and an audio reproduction speed control unit 31.

The CPU 21 is a processor that is provided to control operations of the audio reproducing apparatus 20. The CPU 21 is connected to other components of the audio reproducing apparatus 20 over a bus 200. The CPU 21 cooperates with these components. The time management unit 22 comprises a clock device that measures time. The time management unit 22 provides time information which serves as a reference time for the audio data reproducing operation.

The wireless communication device 23 establishes wireless connection with the video reproducing apparatus 10 and performs wireless communication with the video reproducing apparatus 10. The wireless communication is executed according to procedures based on, for instance, Bluetooth™ protocol. The wireless communication device 23, under control of CPU 21, receives the encoded audio data from the video reproducing apparatus 10.

The decoding unit 24 decodes the encoded audio data received by the wireless communication device 23 and decompresses the compressed audio data into a reproducible format. The decoded audio data is stored in the buffer memory 25. The buffer memory 25 is a memory device for temporarily storing audio data to be reproduced. The buffer memory 25 stores audio data having a length corresponding to a reproduction time of, e.g. about 50 msec to 600 msec.

The audio reproducing unit 26 reproduces the audio data stored in the buffer memory 25 and outputs it as sound via the audio output unit 27 comprising a loudspeaker or a headphone. The audio reproducing operation involves, for example, a process for converting the audio data stored in the buffer memory 25 from a digital signal to an analog signal. The reproduction speed of audio data is basically controlled by the time information managed by the time management unit 22 and the sampling rate of the audio data, but it can be altered by the control under the audio reproduction speed control unit 31.

The clock (time information) referred to in the control of the audio reproduction timing in the audio reproduction apparatus 20 differs from the clock (time information) referred to in the control of the video reproduction timing in the video reproducing apparatus 10. As a result, asynchronism may occur between audio reproduced by the audio reproducing apparatus 20 and video reproduced by the video reproducing apparatus 10. If the same clock can be referred to in the video reproduction timing control and the audio reproduction timing control, it is easy to realize synchronous reproduction of audio and video. However, in the system, like the present embodiment, wherein the apparatus for reproducing video and the apparatus for reproducing audio are physically different, it is practically difficult for one apparatus to frequently refer to the clock in the other apparatus.

As mentioned above, in the present embodiment, the audio reproduction timing control is executed referring to a clock (time information of time management unit 22) different from the clock for the video reproduction timing control. While the audio is being reproduced, the audio reproducing apparatus 20 periodically acquires a current video reproduction point from the video reproducing apparatus 10 making use of radio communication with the video reproducing apparatus 10. Based on the acquired video reproduction point, the audio reproducing apparatus 20 corrects the audio reproduction point and thus eliminates asynchronism.

The correction process for the audio reproduction point is executed by the video reproduction point acquiring unit 28, asynchronism amount detection unit 29, sound output level detection unit 30, and audio reproduction speed control unit 31.

Making use of the radio communication performed by the wireless communication device 23 with the video reproducing apparatus 10, the video reproduction point acquiring unit 28 and asynchronism amount detection unit 29 detect the amount of an error between the reproduction point in video data in the video reproducing apparatus 10 and the reproduction point in audio data in the audio reproducing apparatus 20.

Specifically, using the wireless communication device 23, the video reproduction point acquiring unit 28 sends a request for acquiring a video reproduction point to the video reproducing apparatus 10 and acquires the current reproduction point in the video data from the video reproducing apparatus 10. The request for acquiring the video reproduction point is periodically sent to the video reproducing apparatus 10 while the audio data is being reproduced. The asynchronism amount detection unit 29 detects the amount of an error of a relative position of audio data to video data (i.e. the amount of asynchronism) on the basis of the current reproduction point in the audio data reproduced by the audio reproducing unit 26 and the current reproduction point in the video data acquired by the video reproduction point acquiring unit 28.

The current reproduction point in audio data is given by an elapsed time from the start of reproduction of audio data up to now. Similarly, the current reproduction point in video data is given by an elapsed time from the start of reproduction of video data up to now.

The asynchronism amount detection process by the video reproduction point acquiring unit 28 and asynchronism amount detection unit 29 can be executed by utilizing clock synchronization according to, e.g. NTP (Network Time Protocol). The NTP is a protocol for making systems, which are connected via networks, have the same time. Specifically, the video reproducing apparatus 10 and audio reproducing apparatus 20 control the video and audio reproduction timings, referring to their own time management units 12 and 22. The difference between the time indicated by the time management unit 22 of audio reproducing apparatus 20 and the time indicated by the time management unit 12 of video reproducing apparatus 10 is checked using the NTP. Thereby, the amount of error between the current reproduction point of video data and the current reproduction point of audio data can be detected.

The sound output level detection unit 30 analyzes the audio data stream stored in the buffer memory 25, thereby detecting the sound volume level (also referred to as "sound output level") of the audio data stream that is about to be reproduced. This sound volume level detection process detects, from the audio data stream to be reproduced, a time period of an audio data component with a sound volume level lower than a predetermined value.

The audio reproduction speed control unit 31 is configured to execute a control to alter the audio data reproduction speed of the audio reproducing unit 26 in order to eliminate asynchronism. The alteration of audio reproduction speed is effected for the audio data component of the to-be-reproduced audio data, which belongs to the detected time period in which the sound volume level is low. The reason is that if a major alteration of the audio reproduction speed is effected in the time period of an audio data component with a high sound volume level, an unnatural impression may possibly given to the viewer/listener. In the time period of an audio data component with a low sound volume level, alteration of the audio reproduction speed may less possibly cause an unnatural impression to the user.

Figure 5:
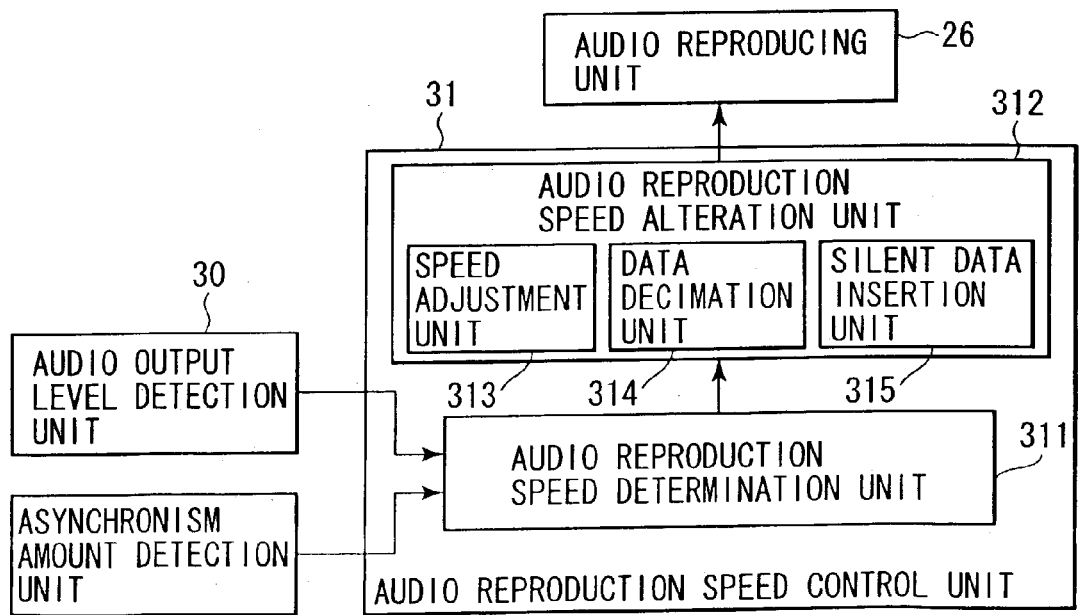
FIG. 5 is a block diagram showing the structure of an audio reproduction speed control unit provided in the audio reproducing apparatus shown in FIG. 1.

The audio reproduction speed control unit 31, as shown in FIG. 5, comprises an audio reproduction speed determination unit 311 and an audio reproduction speed alteration unit 312. The audio reproduction speed determination unit 311 determines the amount of alteration of the audio reproduction speed on the basis of the amount of asynchronism detected by the asynchronism amount detection unit 29 and the detected result of the sound volume level by the sound output level detection unit 30. The amount of alteration of the audio reproduction speed is determined according to preset rules so that the audio reproduction speed may be altered in the time period in which the sound volume level is relatively low. These rules specify a maximum tolerable alteration amount of the audio reproduction speed for each of sound volume levels.

The audio reproduction speed alteration unit 312 alters the audio data reproduction speed in the audio reproducing unit 26 in accordance with the alteration amount of audio reproduction speed determined by the audio reproduction speed determination unit 311. The alteration of the audio reproduction speed is effected in three processes: (1) to increase/decrease the amount of audio data to be reproduced per unit time, (2) to decimate (or delete) audio data, and (3) to insert specific audio data (silent data). Process (1) is a process of increasing or decreasing the audio data reproduction speed, without decimating or inserting data.

In order to execute processes (1), (2) and (3) for the audio reproduction speed alteration, the audio reproduction speed alteration unit 312 includes a speed adjustment unit 313, a data decimation unit 314 and a silent data insertion unit 315. The speed adjustment unit 313 performs a process of increasing or decreasing the amount of audio data to be reproduced per unit time relative to a reference amount, thereby altering the audio data reproduction speed without decimating or inserting data. The reference amount is determined based on the sampling rate of audio data and the clock output from the time management unit 22. The data decimation unit 314 and silent data insertion unit 315 perform processes of decimating the audio data and inserting silent data in the audio data, respectively.

Assume that the reproduction point of video data precedes the reproduction point of audio data. In this case, in order to increase the audio data reproduction speed, the audio reproduction speed control unit 31 increases the amount of audio data to be reproduced per unit time or decimates (e.g. deletes) audio data, thereby eliminating the asynchronism. On the other hand, assume that the reproduction point of video data is behind the reproduction point of audio data. In this case, in order to decrease the audio data reproduction speed, the audio reproduction speed control unit 31 decreases the amount of audio data to be reproduced per unit time or inserts specific data (e.g. silent data), thereby eliminating the asynchronism.

An example of the sound volume level detection process will now be described.

Figure 6:
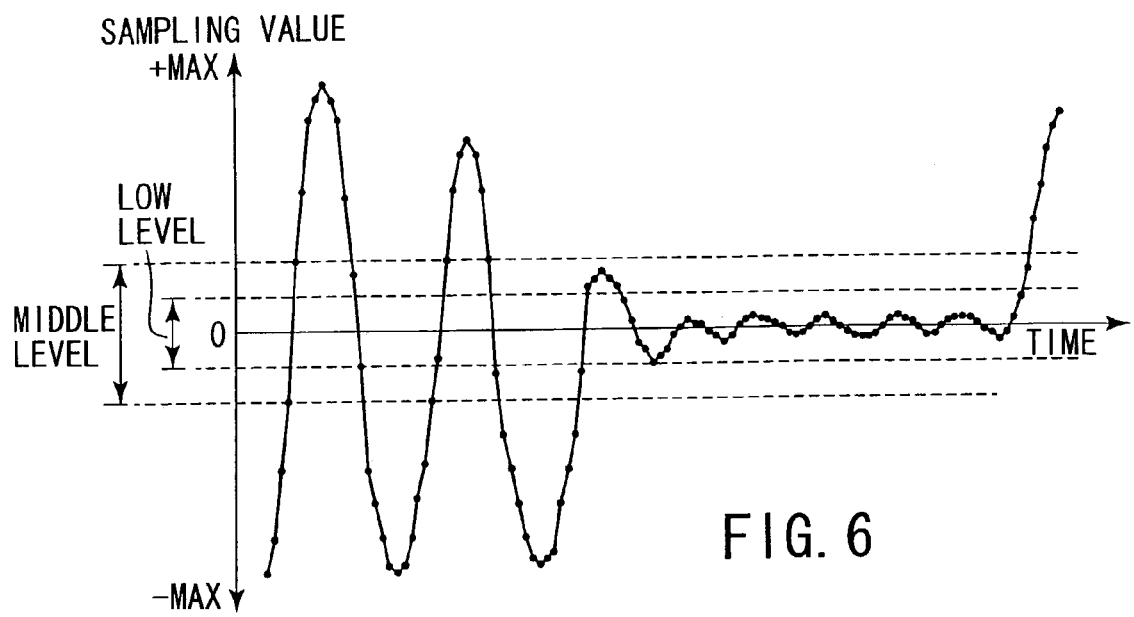
FIG. 6 is a view for explaining a sound volume level detection process executed by an audio output level detection unit provided in the audio reproducing apparatus shown in FIG. 1.

FIG. 6 schematically shows audio data stored in the buffer memory 25. The sound volume level of audio data is given by a magnitude of waveform of a digital audio signal, which is represented by a line connecting time-sequential sample data elements (indicated by black dots in FIG. 6). Each sample data element is obtained by sampling the analog audio signal at a sampling rate of, e.g. 44.1 KHz.

The sound output level detection unit 30 examines, e.g. a variation in amplitude of the audio data waveform, and thus detects an audio time period with "volume level=high", an audio time period with "volume level=medium" and an audio time period with "volume level=low" in the stream of the audio data stored in the buffer memory 25. The audio reproduction speed of the audio data belonging to the audio time period with "volume level=medium" or "volume level low" is altered. The audio reproduction speed of the audio data belonging to the audio time period with "volume level=high" is not altered. The maximum tolerable alteration amount of the audio reproduction speed in the audio time period with "volume level=medium" is smaller than that of the audio reproduction speed in the audio time period with "volume level=small."

The detection of the sound output level uses a first threshold and a second threshold that is lower than the first threshold, with which the three time periods with "volume level=high", "volume level=medium" and "volume level=low" are detected. A time period of audio data, whose amplitude, i.e. sound volume level, is lower than the second threshold, is detected as the time period with "volume level=low." A time period of audio data, whose amplitude, i.e. sound volume level, is between the first and second thresholds, is detected as the time period with "volume level=middle." A time period of audio data, whose amplitude, i.e. sound volume level, is higher than the first threshold, is detected as the time period with "volume level=high."

The first and second thresholds are predetermined fixed values.

A description will now be given of the operation of the audio reproduction control process executed by the audio reproduction apparatus 20.

Figure 7:
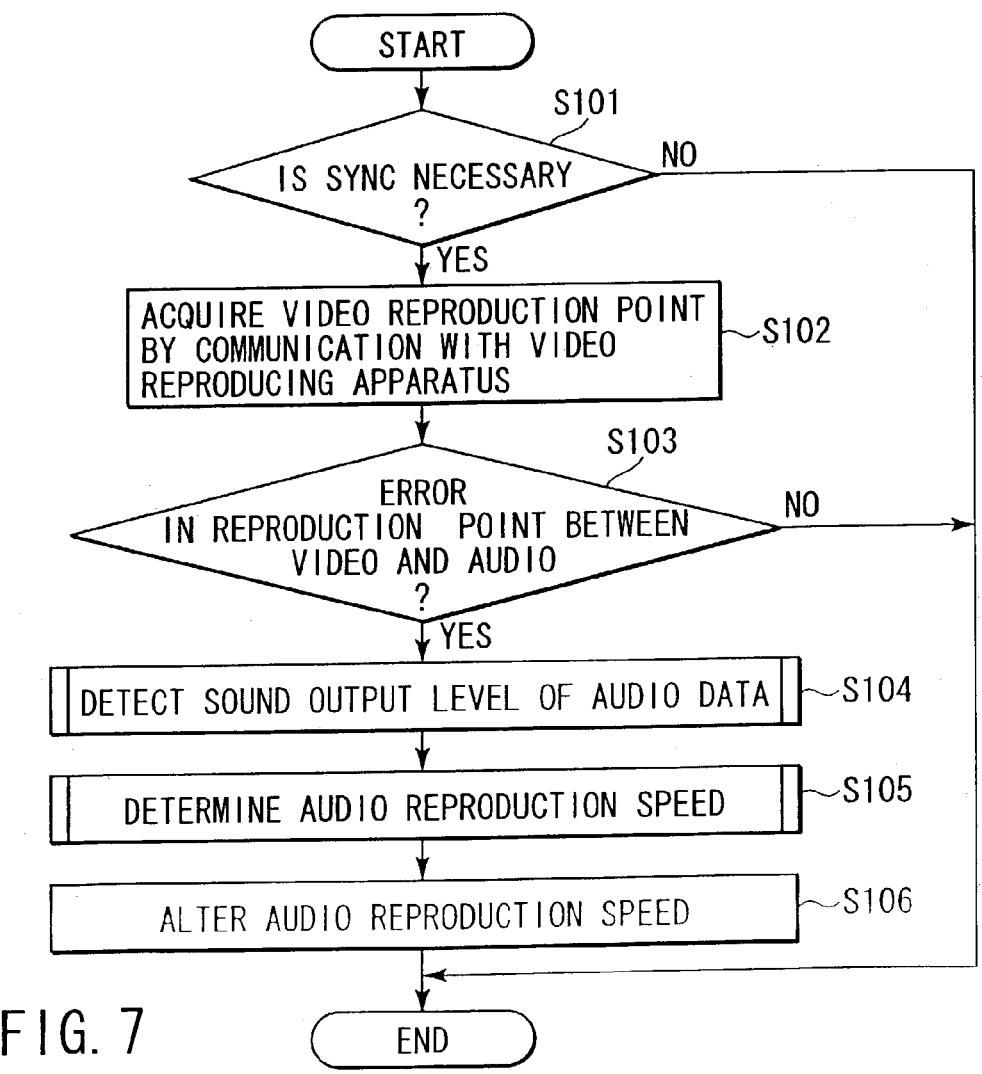
FIG. 7 is a flow chart illustrating an audio reproduction control process executed by the audio reproducing apparatus shown in FIG. 1.

A flow chart of FIG. 7 illustrates procedures by which the audio reproducing apparatus 20 detects asynchronism between video and audio and alters the audio reproduction speed on the basis of the detection result.

The audio reproducing apparatus 20, while receiving audio data from the video reproducing apparatus 10, reproduces the audio data. During the audio data reproduction time period, the audio reproducing apparatus 20 executes a synchronization process at predetermined time intervals, thereby to reproduce the audio in sync with the video reproduction in the video reproducing apparatus 10.

Specifically, the audio reproducing apparatus 20 determines whether synchronism needs to be established, on the basis of an elapsed time from the last synchronization process (step S101). If the elapsed time from the last synchronization process is a predetermined time or more (YES in step S101), the audio reproducing apparatus 20 performs the following synchronization process.

To begin with, making use of the communication between the wireless communication device 23 and video reproducing apparatus 10, the video reproduction point acquiring unit 28 of audio reproducing apparatus 20 acquires the reproduction point of video currently reproduced by the video reproducing apparatus 10 (step S102). Then, the asynchronism amount detection unit 29 compares the video reproduction point in the video reproducing apparatus 10 acquired in step S102 and the audio reproduction point in the audio reproducing apparatus 20, and determines whether there is an error between the reproduction point of video and reproduction point of audio (step S103).

If there is an error between the reproduction point of video and reproduction point of audio (YES in step S103), the sound output level detection unit 30 of audio reproducing apparatus 20 performs sound volume level detection for the audio data stream stored in the buffer 25, which follows the reproduction point of audio that is currently reproduced (step S104). Subsequently, the audio reproduction speed determination unit 311 of audio reproduction speed control unit 31 determines the time period of audio data, whose reproduction speed is to be altered, and the amount of alteration in reproduction speed in this time period, according to preset rules, on the basis of the error in reproduction point between video and audio, which has been detected in step S103, and the sound volume level of audio data detected in step S104 (step S105).

Figures 8, 9:
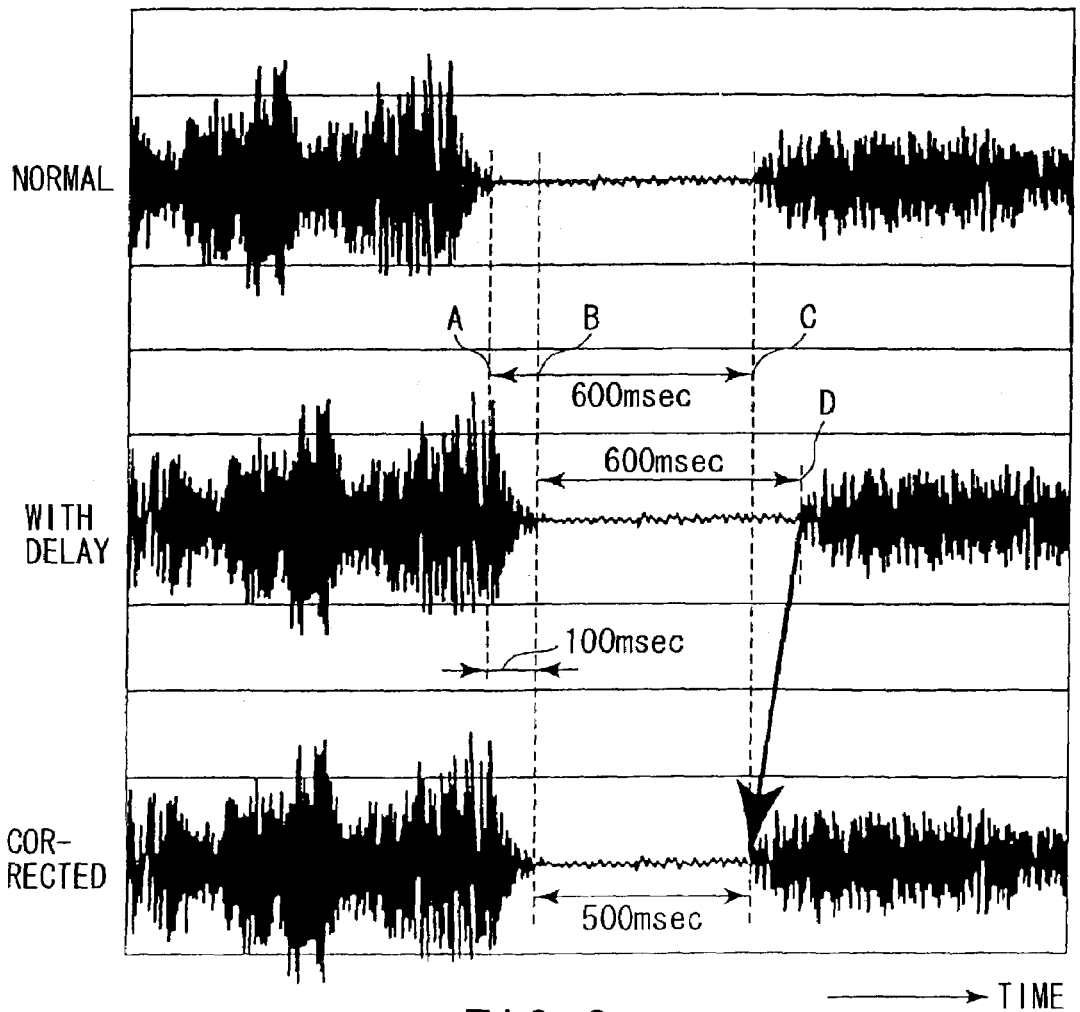
FIG. 8 shows an example of rules to be used when the audio reproducing apparatus shown in FIG. 1 determines an amount of change in audio reproduction speed.
FIG. 9 shows a state in which the audio data reproduction speed is altered in the audio reproducing apparatus shown in FIG. 1.

FIG. 8 shows an example of the rules used in determining the amount of alteration in audio reproduction speed. In the table of FIG. 8, the first row shows the sound volume levels of audio data detected in step S104. The second row indicates maximum tolerable alteration amounts of audio reproduction speed, which are associated with the sound volume levels in the first row, that is, maximum tolerable increase/decrease ranges of the data amount of audio to be reproduced per unit time. Similarly, the third row indicates maximum tolerable times for audio data insertion or decimation (deletion), which are associated with the sound volume levels in the first row, that is, time periods corresponding to maximum tolerable data lengths of audio data which can be inserted or deleted per unit time.

The maximum tolerable alteration amount of audio reproduction speed and the maximum tolerable time for audio data insertion/deletion take higher values as the sound volume level becomes lower, and take lower values as it becomes higher.

The alteration of audio reproduction speed or the insertion/deletion of audio data is repeated more than once until the asynchronism between video and audio is eliminated. If the asynchronism is not eliminated within a predetermined time period from the start of the audio reproduction speed alteration, the audio data is immediately deleted or inserted by the amount corresponding to the time necessary for eliminating the asynchronism, irrespective of the sound volume level of audio data to be reproduced.

In order to eliminate asynchronism between video and audio in the audio reproducing apparatus 20, the audio reproduction point is corrected with reference to the video reproduction point. If the reproduction point of video data precedes the reproduction point of audio data, the amount of audio data to be reproduced per unit time is increased or the audio data is deleted, thereby eliminating the asynchronism. On the other hand, if the reproduction point of video data is behind the reproduction point of audio data, the amount of audio data to be reproduced per unit time is decreased or audio data (silent data) is inserted, thereby eliminating the asynchronism.

In step S105, in this manner, the amount of increase/decrease of audio data to be reproduced per unit time, or the time for audio data insertion/deletion, is determined. In accordance with the determination, the audio reproduction speed alteration unit 312 of audio reproduction speed control unit 31 controls the audio reproducing unit 26, and alters the audio reproduction speed of audio reproducing unit 26 (step S106).

An example of the process in steps S104 to S106 will now be described with reference to FIG. 9.

FIG. 9 shows a state in which the audio data reproduction speed is altered. FIG. 9 shows three audio data waveforms. The upper audio data waveform indicates a normal state with no asynchronism. The middle audio data waveform indicates a state in which asynchronism has occurred and the audio data reproduction is behind the video data reproduction. The lower audio data waveform indicates a state in which asynchronism has been eliminated by the process of altering the audio reproduction speed.

Assume that a delay of 100 msec has detected at time instant A in FIG. 9. In this case, the sound volume level of audio data in the buffer memory 25, which follows the time instant A, is detected (step S104). Based on the detected sound volume level, the amount of alteration of the audio reproduction speed is determined according to the rules shown in FIG. 8 (step S105).

The sound volume level of the audio data belonging to a time period (100 msec) between time instant A and time instant B is "high". Thus, according to the rules, the amount of alteration of the audio reproduction speed in the time period between time instant A and time instant B is 0 msec. However, the sound volume level of the audio data belonging to a time period (600 msec) between time instant B and time instant D is "low". Thus, according to the rules, insertion or decimation of audio data in a range of ±500 msec per second is permitted. The detected delay is 100 msec. This delay can be eliminated by deleting audio data corresponding to 100 msec from the audio data belonging to the time period (600 msec) between time instant B and time instant D. Specifically, the audio data in the time period (600 msec) between time instant B and time instant D is reduced to 500 msec. Thereby, the reproduction point of audio data is made to coincide with the reproduction point of video data at time instant C.

When asynchronism is to be detected by the NTP, it is preferable to advance the time of the time management unit 22 by 100 msec at the time instant C at which the error in reproduction point is eliminated.

As has been described above in detail, according to the present embodiment, the amount of asynchronism can be suppressed within a predetermined range by the audio reproduction speed alteration process, even without strictly making the clock in the video reproducing apparatus 10 coincide with the clock in the audio reproducing apparatus 20. Therefore, even in a system wherein video and audio are reproduced by different apparatuses, a so-called lip-sync can easily be achieved. In particular, since the audio reproduction speed is altered in the time period in which the sound volume level of audio data is low, lip-sync can be realized without giving unnatural impression to the viewer/listener.

Figure 10:
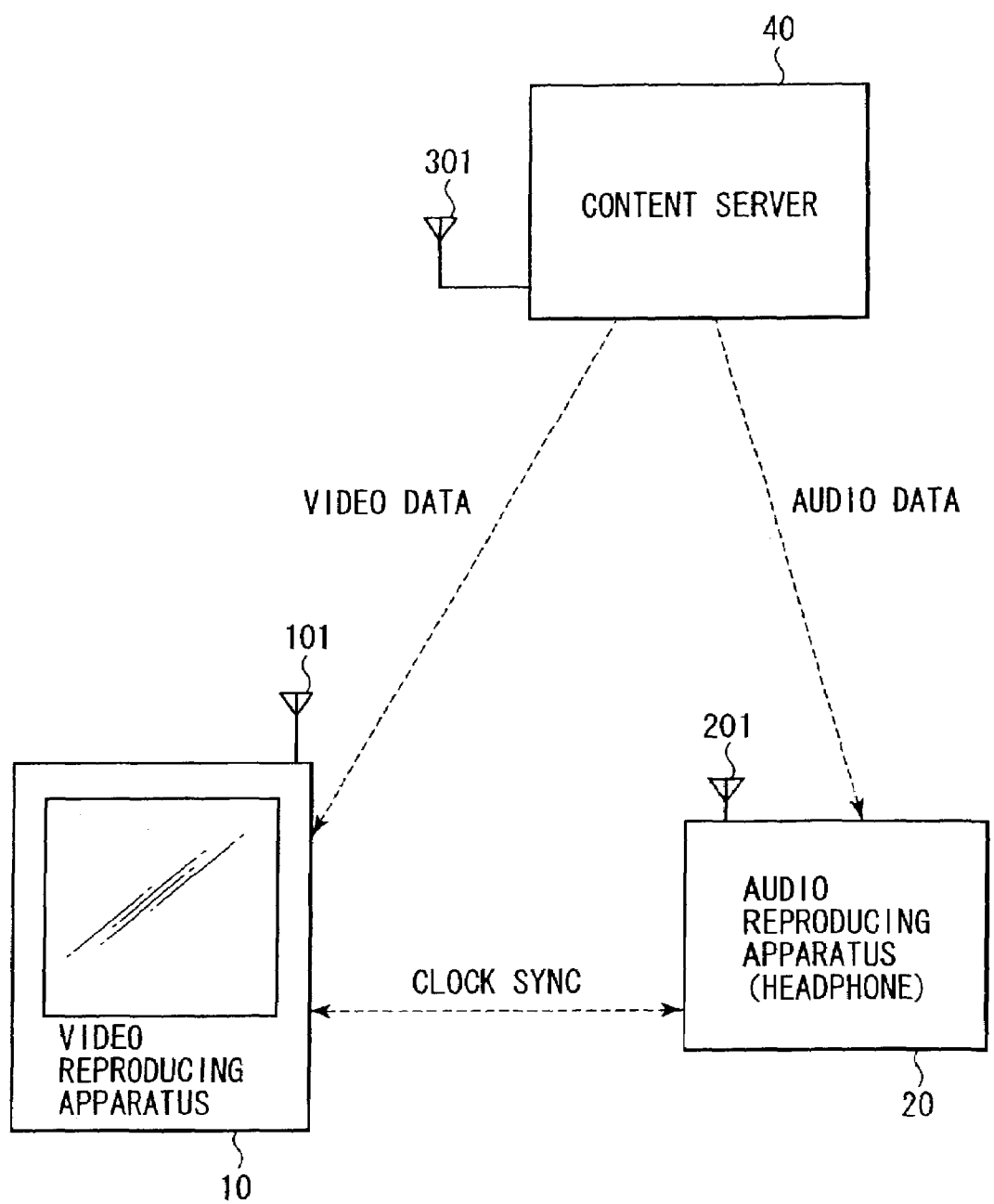
FIG. 10 is a block diagram showing an example of a system wherein audio data is sent from a server to the audio reproducing apparatus.

It is not necessary that the video reproducing apparatus 10 sends audio data to the audio reproducing apparatus 20. For example, as shown in FIG. 10, a content server 40 may send video data and audio data to the video reproducing apparatus 10 and audio reproducing apparatus 20 by radio signals via an antenna 301. In this case, too, the audio reproducing apparatus 20 may periodically acquire a video reproduction point from the video reproducing apparatus 10, thereby detecting asynchronism between video and audio.

The audio reproduction control process in the audio reproducing apparatus 20 according to the present embodiment may be realized by computer-executable programs. In this case, a computer-readable storage medium storing computer programs including procedures of the above-described audio reproduction control process is prepared. The computer programs are installed in an ordinary computer with a communication function and executed, and thereby the same advantages as with the present embodiment can easily be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An audio reproducing apparatus that reproduces audio data to be reproduced in sync with video data, comprising:
   a communication device configured to execute communication with another apparatus that reproduces the video data;
   a unit configured to detect an amount of an error between a reproduction point of the video data in said another apparatus and a reproduction point of the audio data in the audio reproducing apparatus by making use of the communication executed by the communication device with said another apparatus;
   a unit configured to detect, from a stream of the audio data, an audio data time period of audio data with a sound volume level lower than a specified value; and
   a unit configured to alter a reproduction speed of the audio data belonging to the detected audio data time period, on the basis of the detected amount of the error in reproduction point.

2. The audio reproducing apparatus according to claim 1, wherein the unit that alters the reproduction speed includes a unit that decimates audio data belonging to the detected audio data time period.

3. The audio reproducing apparatus according to claim 1, wherein the unit that alters the reproduction speed includes a unit that inserts silent data in the detected audio data time period.

4. The audio reproducing apparatus according to claim 1, wherein the unit that alters the reproduction speed includes a unit that alters an amount of audio data to be reproduced per unit time, the audio data belonging to the detected audio data time period.

5. The audio reproducing apparatus according to claim 1, wherein the unit that detects an audio data time period of audio data with a sound volume level lower than a specified value is configured to detect, from the stream of the audio data, a first audio data time period of audio data with a sound volume level falling within a range between a first sound volume level and a second sound volume level lower than the first sound volume level, and a second audio data time period of audio data with a sound volume level lower than the second sound volume level, and
   the unit that alters the reproduction speed includes a unit that determines an alteration amount of reproduction speed of audio data belonging to each of the first and second audio data time periods, on the basis of a maximum tolerable alteration amount relating to the reproduction speed of audio data, which is specified for each of the first and second audio data time periods, and the detected amount of the error in reproduction point.

6. The audio reproducing apparatus according to claim 1, wherein the communication device is configured to execute communication with said another apparatus using radio signals.

7. The audio reproducing apparatus according to claim 1, wherein the communication device is configured to execute communication with said another apparatus, thereby receiving the audio data from said another apparatus,
   the audio reproducing apparatus further comprises a memory device that temporarily stores the received audio data, and
   the unit that detects an audio data time period of audio data with a sound volume level lower than a specified value is configured to detect, from the stream of the audio data stored in the memory device, an audio data time period of audio data with a sound volume level lower than the specified value.

8. The audio reproducing apparatus according to claim 7, wherein the communication device is configured to execute communication with said another apparatus using radio signals.

9. The audio reproducing apparatus according to claim 1, wherein the unit that detects the amount of an error includes:
   means for acquiring a current reproduction point of video data from said another apparatus by using the communication device; and
   means for comparing the acquired reproduction point of video data and the reproduction point of the audio data in the audio reproducing apparatus.

10. An audio reproduction control method for controlling a reproduction operation of an audio reproducing apparatus that reproduces audio data to be reproduced in sync with video data, comprising:
    executing communication with another apparatus that reproduces the video data, thereby detecting an amount of an error between a reproduction point of the video data in said another apparatus and a reproduction point of the audio data in the audio reproducing apparatus;
    detecting, from a stream of the audio data, an audio data time period of audio data with a sound volume level lower than a specified value; and
    altering a reproduction speed of the audio data belonging to the detected audio data time period, on the basis of the detected amount of the error in reproduction point.

11. The audio reproduction control method according to claim 10, wherein the altering of the reproduction speed includes decimating audio data belonging to the detected audio data time period.

12. The audio reproduction control method according to claim 10, wherein the altering of the reproduction speed includes inserting silent data in the detected audio data time period.

13. The audio reproduction control method according to claim 10, wherein the altering of the reproduction speed includes altering an amount of audio data to be reproduced per unit time, the audio data belonging to the detected audio data time period.

14. The audio reproduction control method according to claim 10, wherein the detecting of an audio data time period of audio data with a sound volume level lower than a specified value includes detecting, from the stream of the audio data, a first audio data time period of audio data with a sound volume level falling within a range between a first sound volume level and a second sound volume level lower than the first sound volume level, and a second audio data time period of audio data with a sound volume level lower than the second sound volume level, and
    the altering of the reproduction speed includes determining an alteration amount of reproduction speed of audio data belonging to each of the first and second audio data time periods, on the basis of a maximum tolerable alteration amount relating to the reproduction speed of audio data, which is specified for each of the first and second audio data time periods, and the detected amount of the error in reproduction point.

15. The audio reproduction control method according to claim 10, wherein the communication with said another apparatus is executed by wireless communication.

16. The audio reproduction control method according to claim 10, further comprising:
   receiving the audio data from said another apparatus via a communication device provided in said another apparatus, and
   temporarily storing the received audio data in a memory device provided in the audio reproducing apparatus, and
   wherein the detecting of an audio data time period of audio data with a sound volume level lower than a specified value includes detecting, from the stream of the audio data stored in the memory device, an audio data time period of audio data with a sound volume level lower than the specified value.

17. The audio reproduction control method according to claim 16, wherein the audio data is sent from said another apparatus by radio signals.

18. The audio reproduction control method according to claim 10, wherein the detecting of the amount of an error includes:
   acquiring a current reproduction point of video data from said another apparatus by communication with said another apparatus at predetermined time intervals; and
   comparing the acquired reproduction point of video data and the reproduction point of the audio data in the audio reproducing apparatus.

* * * * *